United States Patent
Giger et al.

(10) Patent No.: US 7,298,883 B2
(45) Date of Patent: Nov. 20, 2007

(54) AUTOMATED METHOD AND SYSTEM FOR ADVANCED NON-PARAMETRIC CLASSIFICATION OF MEDICAL IMAGES AND LESIONS

(75) Inventors: Maryellen L Giger, Elmhurst, IL (US); Dacian Bonta, Chicago, IL (US)

(73) Assignee: University of Chicago, Chicago, IL (US)

( * ) Notice: Subject to any disclaimer, the term of this patent is extended or adjusted under 35 U.S.C. 154(b) by 635 days.

(21) Appl. No.: 10/724,395

(22) Filed: Dec. 1, 2003

(65) Prior Publication Data

US 2004/0190763 A1 Sep. 30, 2004

Related U.S. Application Data

(60) Provisional application No. 60/429,538, filed on Nov. 29, 2002.

(51) Int. Cl.
*G06K 9/00* (2006.01)

(52) U.S. Cl. ............... 382/132; 382/170; 382/190; 600/443

(58) Field of Classification Search ......... 382/125, 382/128, 129, 130, 131, 132, 133, 134, 190, 382/198, 170; 378/4, 21, 23, 25, 26, 27, 378/37, 901; 600/300, 411, 425, 427, 407, 600/410; 128/906, 915, 920, 922; 250/363.04
See application file for complete search history.

(56) References Cited

U.S. PATENT DOCUMENTS

| | | | | | |
|---|---|---|---|---|---|
| 5,657,362 | A | * | 8/1997 | Giger et al. | 378/37 |
| 5,790,690 | A | * | 8/1998 | Doi et al. | 382/128 |
| 5,999,639 | A | * | 12/1999 | Rogers et al. | 382/132 |
| 6,058,322 | A | * | 5/2000 | Nishikawa et al. | 600/408 |
| 6,282,305 | B1 | * | 8/2001 | Huo et al. | 382/128 |

OTHER PUBLICATIONS

U.S. Appl. No. 10/724,395, filed Dec. 1, 2003, Giger et al.
U.S. Appl. No. 10/777,041, filed Feb. 13, 2004, Giger et al.
U.S. Appl. No. 10/360,814, filed Feb. 10, 2003, Giger et al.
U.S. Appl. No. 10/617,675, filed Jul. 14, 2003, Giger et al.
Harald Ganster, et al. "Automated Melanoma Recognition"; IEEE Transactions on Medical Imaging; vol. 20, No. 3, Mar. 2001; pp. 233-239.

(Continued)

*Primary Examiner*—Samir Ahmed
*Assistant Examiner*—Abolfazl Tabatabai
(74) *Attorney, Agent, or Firm*—Oblon, Spivak, McClelland, Maier & Neustadt, P.C.

(57) ABSTRACT

A computer-aided diagnosis (CAD) scheme to aid in the detection, characterization, diagnosis, and/or assessment of normal and diseased states (including lesions and/or images). The scheme employs lesion features for characterizing the lesion and includes non-parametric classification, to aid in the development of CAD methods in a limited database scenario to distinguish between malignant and benign lesions. The non-parametric classification is robust to kernel size.

9 Claims, 11 Drawing Sheets

OTHER PUBLICATIONS

Agness Schumann, Free University of Berlin, Geoinformatics, Germany, 12249 Berlin, Malteserstr, 74-100, Neural Networks Versus Statistics: a Comparing Study of Their Classification Performance on Well Log Data.

Rudolf T. Suurmond, Erik Bergkvist, Working Paper, Artificial neural netrworks and statistical approaches to classifying remotely sensed data; WP-96-131, Nov. 1996; International Institute for Applied Systems Analysis, Laxenburg Austria.

Rudolf T. Suurmond, Erik Bergkvist, "Different artificial neural network and statistical approaches in classifying remotely sensed data", pp. 1-28.

* cited by examiner

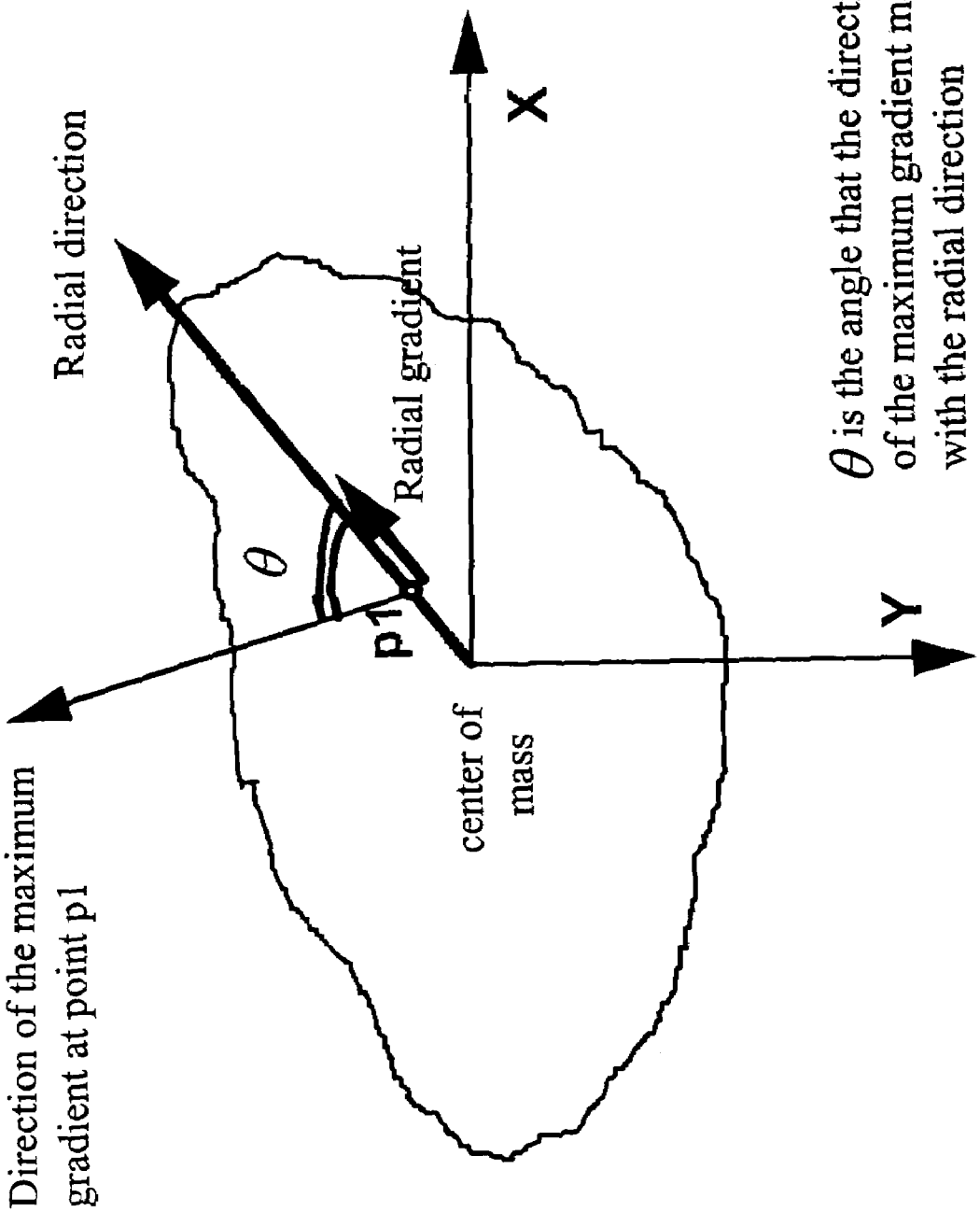

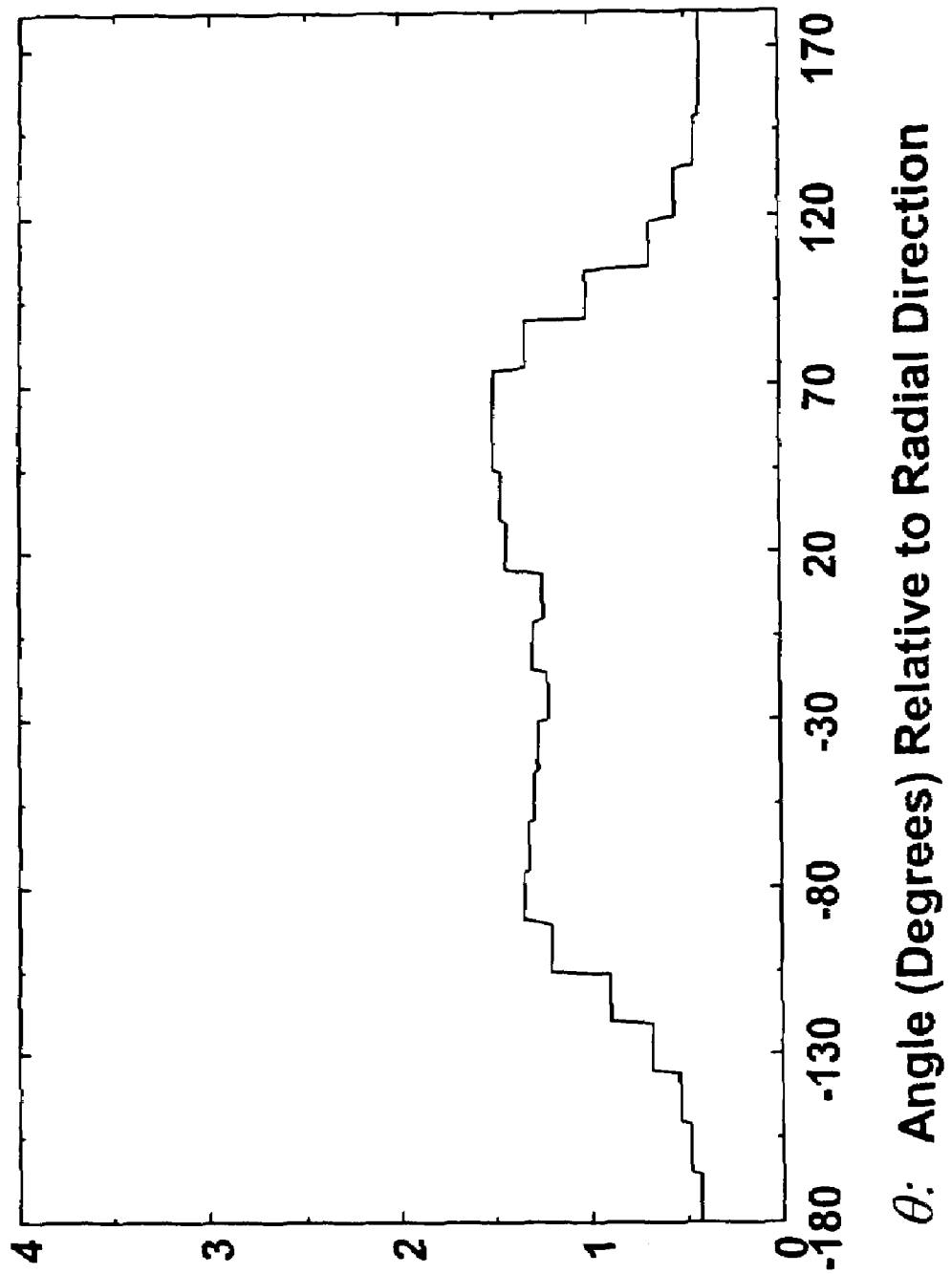

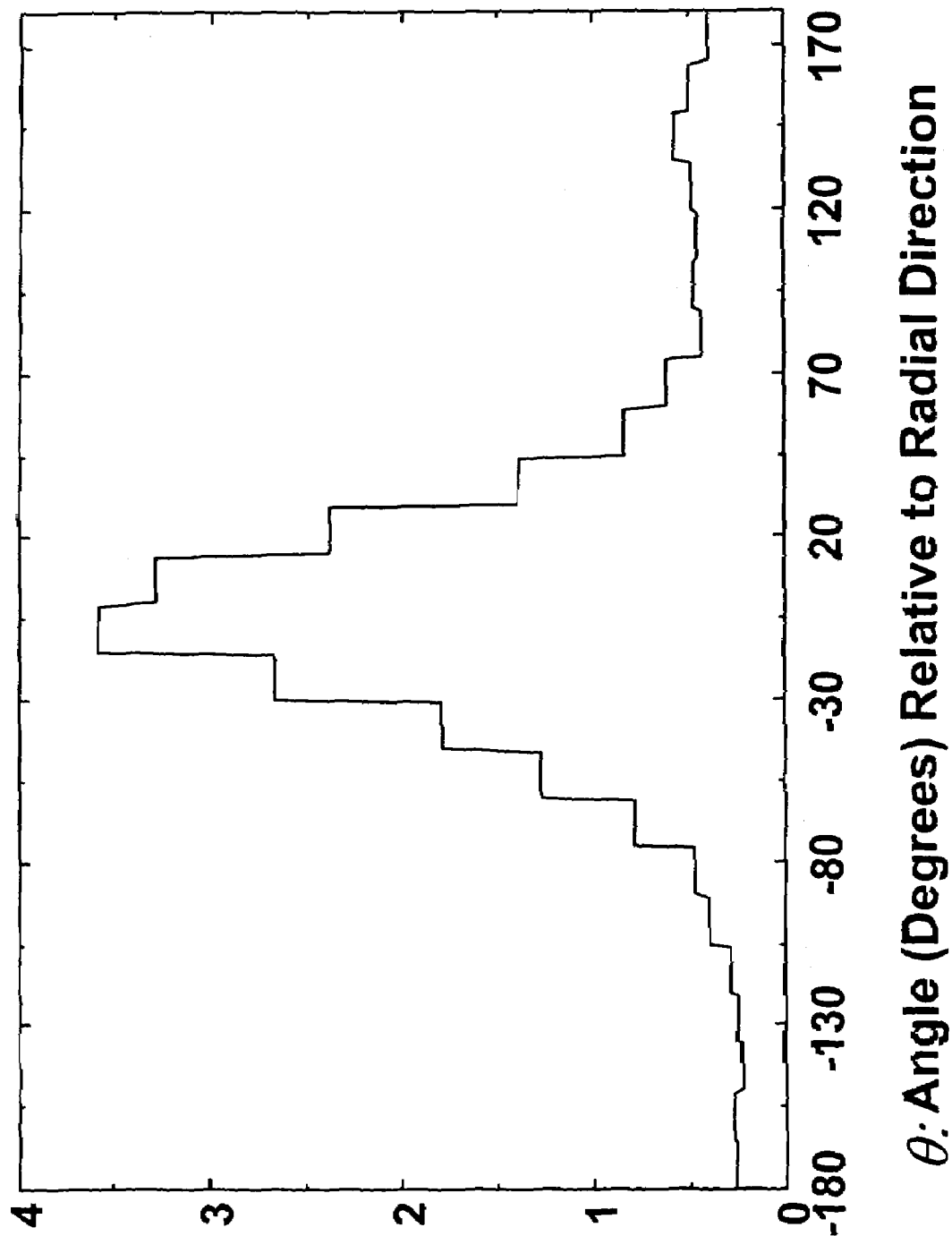

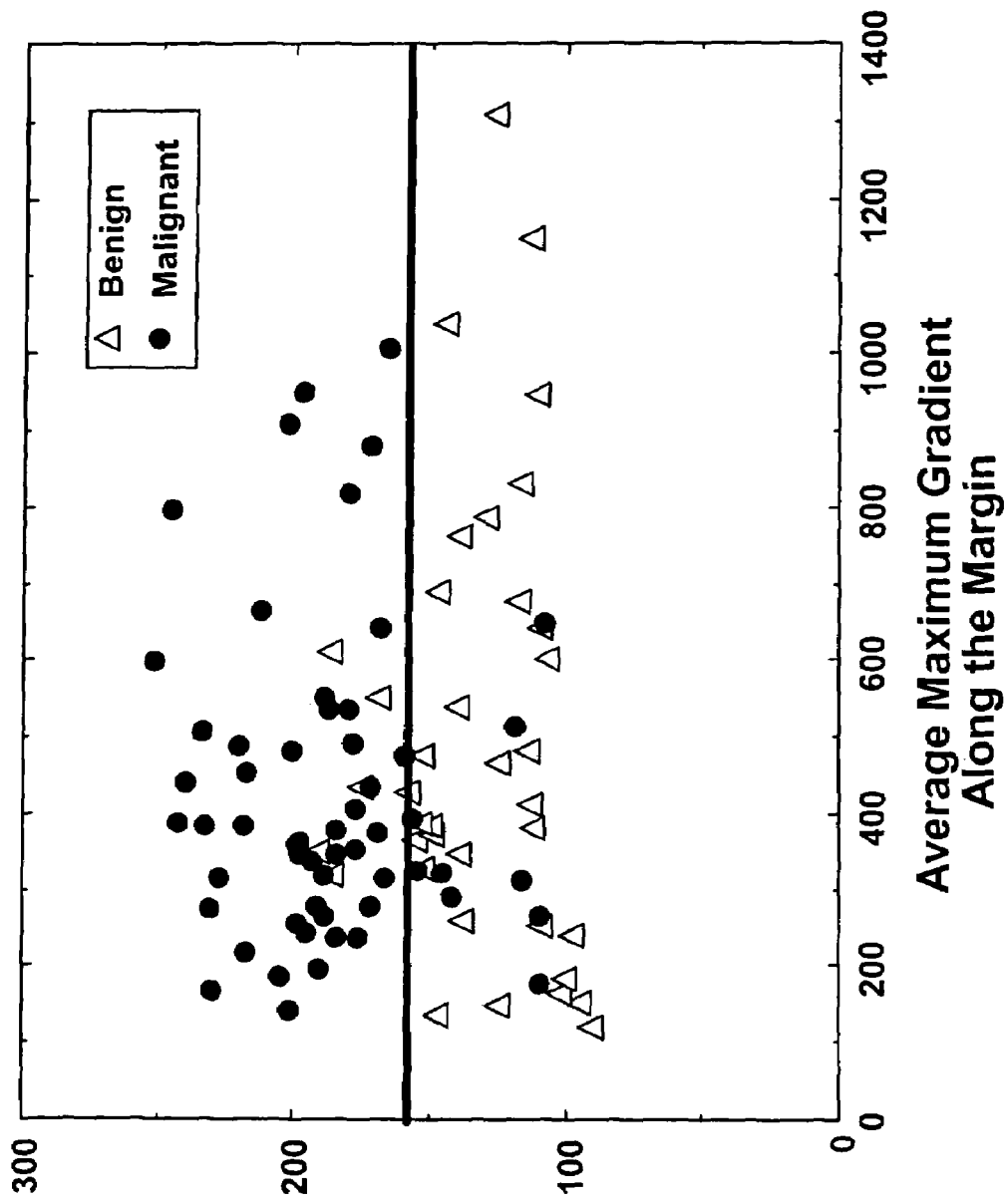

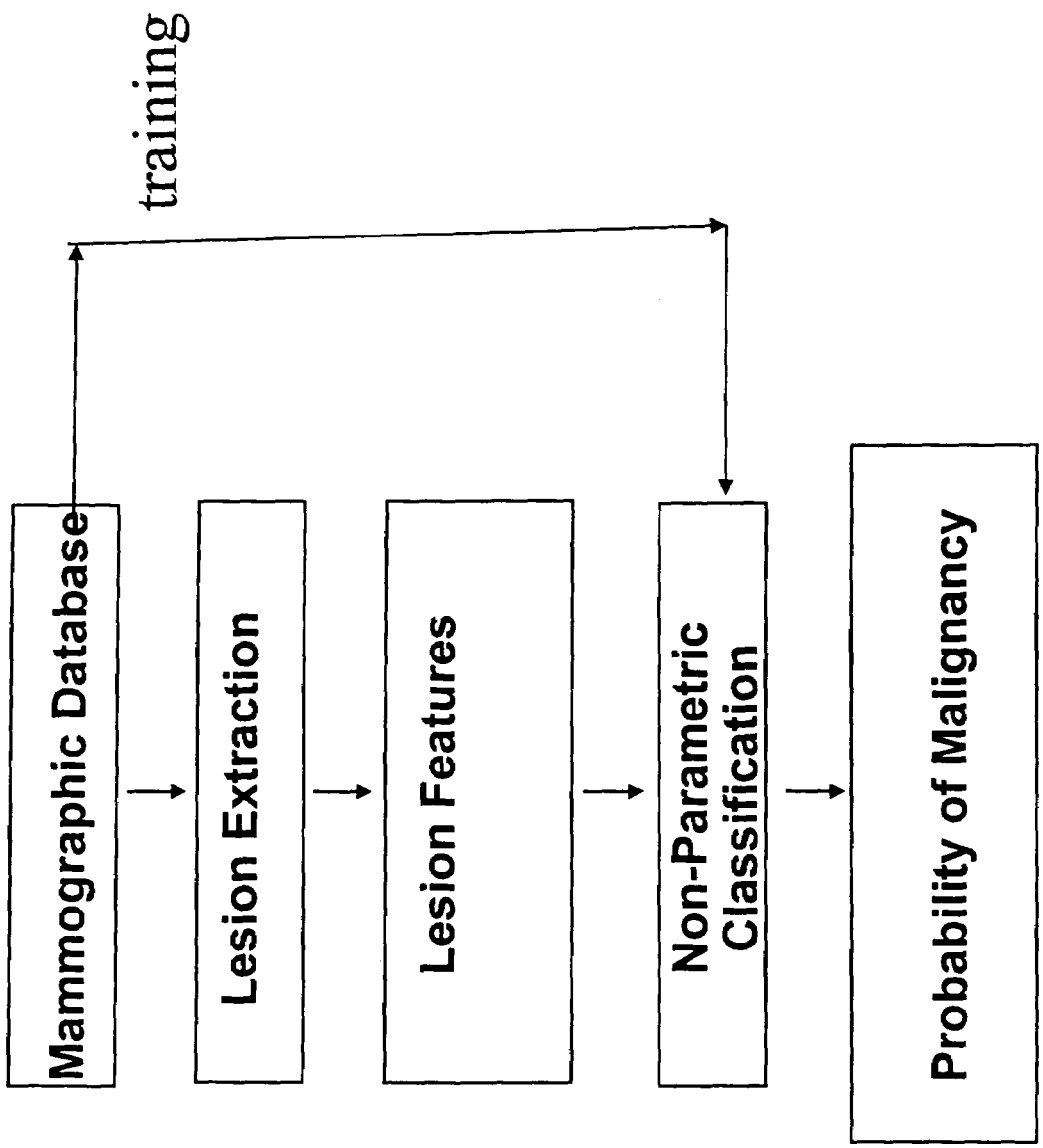

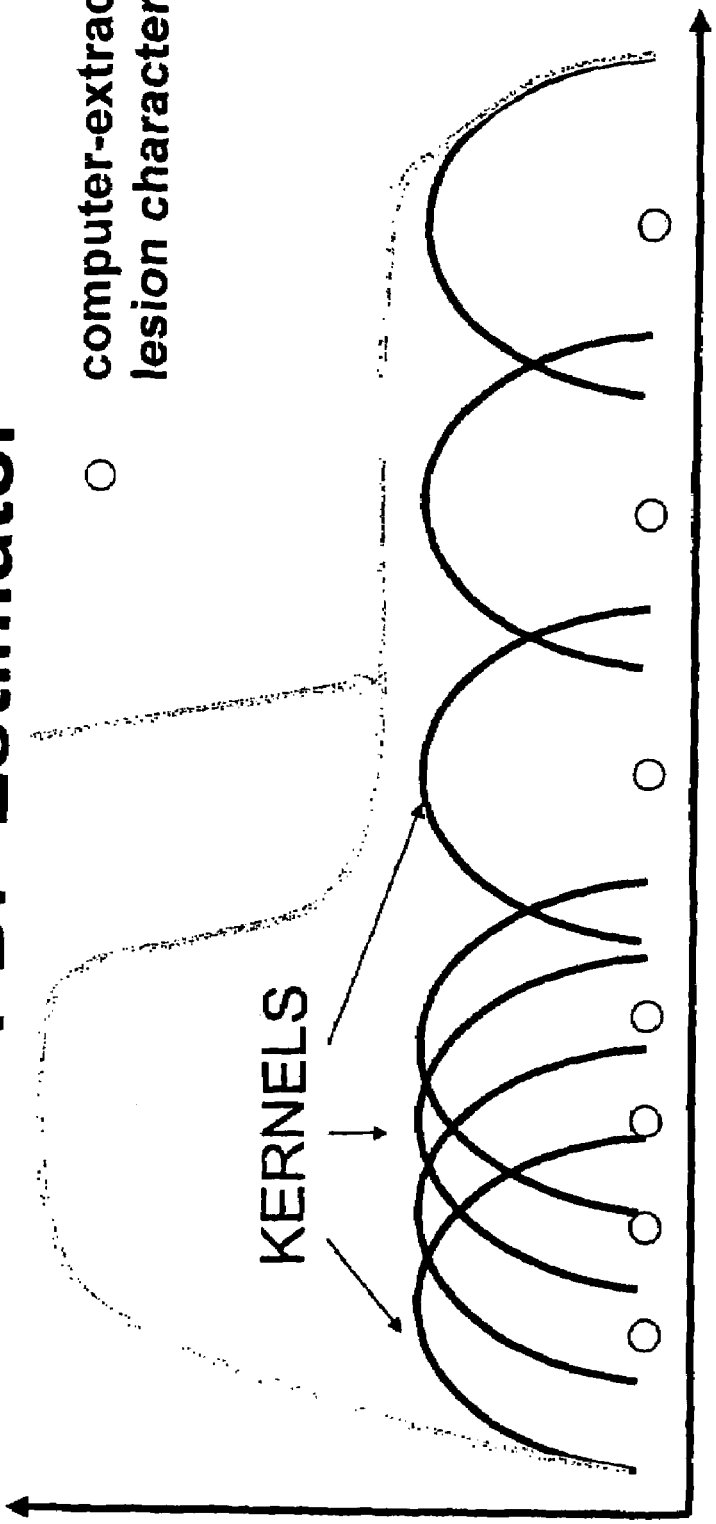

AUTOMATED METHOD AND SYSTEM FOR ADVANCED NON-PARAMETRIC CLASSIFICATION OF MEDICAL IMAGES AND LESIONS

CROSS REFERENCE TO RELATED APPLICATIONS

The present application is related to and claims the benefit of provisional U.S. Patent Application No. 60/429,538, filed on Nov. 29, 2002, the entire contents of which are incorporated herein by reference.

The present invention was made in part of U.S. Government support under NIH Grant ROI CA89452. The U.S. Government may have certain rights to this invention.

BACKGROUND OF THE INVENTION

1. Field of the Invention

The invention relates generally to the field of computer-aided diagnosis (CAD) including detection, characterization, diagnosis, and/or assessment of normal and diseased states (including lesions).

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; as well as U.S. patent applications Ser. Nos. 08/173,935; 08/398,307 (PCT Publication WO 96/27846); Ser. Nos. 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 60/332,005; and 60/331,995; as well as co-pending U.S. patent applications (listed by attorney docket number) 215752US-730-730-20, 216439US-730-730-20, and references identified in the following List of Non-Patent References by the author(s) and year of publication and cross referenced throughout the specification by reference to the respective number, in parentheses, of the reference:

List of Non-Patent References

1. Feig S A: Decreased breast cancer mortality through mammographic screening: Results of clinical trials. Radiology 167:659-665, 1988.
2. Tabar L, Fagerberg G, Duffy S W, Day N E, Gad A, Grontoft O: Update of the Swedish two-county program of mammographic screening for breast cancer. Radiol Clin North Am 30:187-210, 1992.
3. Smart C R, Hendrick R E, Rutledge J H, Smith R A: Benefit of mammography screening in women ages 40 to 49 years: Current evidence from randomized controlled trials. Cancer 75:1619-26, 1995.
4. Bassett L W, Gold R H: Breast Cancer Detection: Mammography and Other Methods in Breast Imaging New York: Grune and Stratton, 1987.
5. Kopans DB: Breast Imaging. Philadelphia: JB Lippincott, 1989.
6. Brown M L, Houn F, Sickles E A, Kessler L G: Screening mammography in community practice: positive predictive value of abnormal findings and yield of follow-up diagnostic procedures. AJR 165:1373-1377, 1995.
7. Giger M L: Computer-aided diagnosis. In: Syllabus: A Categorical Course on the Technical Aspects of Breast Imaging, edited by Haus A, Yaffe M. Oak Brook, Ill.: RSNA Publications, 1993, pp. 272-298.
8. Vyborny C J, Giger M L: Computer vision and artificial intelligence in mammography. AJR 162:699-708, 1994.
9. Giger M L, Huo Z, Kupinski M A, Vyborny C J: "Computer-aided diagnosis in mammography", In: Handbook of Medical Imaging, Volume 2. Medical Imaging Processing and Analysis, (Sonka M, Fitzpatrick M J, eds) SPIE, pp. 915-1004, 2000.
10. D'Orsi C J, Bassett L W, Feig S A, Jackson V P, Kopans D B, Linver M N, Sickles E A, Stelling C B: Breast Imaging Reporting and Data System (BI-RADS). Reston, Va. (American College of Radiology), 1998.
11. Getty D J, Pickett R M, D'Orsi C J, Swets J A: Enhanced interpretation of diagnostic images. Invest. Radiol. 23: 240-252, 1988.
12. Swets J A, Getty D J, Pickett R M, D'Orsi C J, Seltzer S E, McNeil B J: Enhancing and evaluating diagnostic accuracy. Med Decis Making 11:9-18, 1991.
13. Cook H M, Fox M D: Application of expert systems to mammographic image analysis. American Journal of Physiologic Imaging 4: 16-22, 1989.
14. Gale A G, Roebuck E J, Riley P, Worthington B S, et al.: Computer aids to mammographic diagnosis. British Journal of Radiology 60: 887-891, 1987.
15. Getty D J, Pickett R M, D'Orsi C J, Swets J A: Enhanced interpretation of diagnostic images. Invest. Radiol. 23: 240-252, 1988.
16. Swett H A, Miller P A: ICON: A computer-based approach to differential diagnosis in radiology. Radiology 163: 555-558, 1987.
17. Huo Z, Giger M L, Vyborny C J, Bick U, Lu P, Wolverton D E, Schmidt R A: Analysis of spiculation in the computerized classification of mammographic masses" Medical Physics 22:1569-1579, 1995.
18. Jiang Y, Nishikawa R M, Wolverton D E, Giger M L, Doi K, Schmidt R A, Vyborny C J: Automated feature analysis and classification of malignant and benign clustered microcalcifications. Radiology 198(3):671-678, 1996.
19. Ackerman L V, Gose E E: Breast lesion classification by computer and xeroradiography. Breast Cancer 30:1025-1035, 1972.
20. Patrick E A, Moskowitz M, Mansukhani V T, Gruenstein E I: Expert learning system network for diagnosis of breast calcifications. Invest Radiol 16: 534-539, 1991.
21. Huo Z, Giger M L, Vyborny C J, Wolverton D E, Schmidt R A, Doi K: Automated computerized classification of malignant and benign mass lesions on digitized mammograms. Academic Radiology 5: 155-168, 1998.
22. Jiang Y, Nishikawa R M, Schmidt R A, Metz C E, Giger M L, Doi K: Improving breast cancer diagnosis with computer-aided diagnosis. Academic Radiology 6: 22-33, 1999.
23. Huo Z, Giger M L, Metz C E: Effect of dominant features on neural network performance in the classification of mammographic lesions. PMB 44: 2579-2595, 1999.
24. Huo Z, Giger M L, Vyborny C J, Wolverton D E, Metz C E: Computerized classification of benign and malignant masses on digitized mammograms: a robustness study. Academic Radiology 7:1077-1084 2000.

25. American Cancer Society. Cancer facts and Figures—1998. New York, N.Y. 1998; p. 20.
26. Metz C E. ROC methodology in radiologic imaging. Invest Radiol 1986; 21:720-733.
27. Efromovich, Sam. "Nonparametric curve estimation: methods, theory and applications". Springer, N.Y. 1999
28. Silverman, B. W. "Density Estimation for Statistics and Data Analysis", Chapman and Hall, London, N.Y., 1986.
29. Zhou K H, Hall W J, Shapiro D E. "Smooth nonparametric receiver operating characteristic (ROC) curves for continuous diagnostic tests". Stat Med., 1997, 16(19): 2143-56.

The following patents and patent applications may be considered relevant to the field of the present invention:

30. Doi K, Chan H-P, Giger M L: Automated systems for the detection of abnormal anatomic regions in a digital x-ray image. U.S. Pat. No. 4907156, March 1990.
31. Giger M L, Doi K, Metz C E, Yin F-F: Automated method and system for the detection and classification of abnormal lesions and parenchymal distortions in digital medical images. U.S. Pat. No. 5133020, July 1992.
32. Doi K, Matsumoto T, Giger M L, Kano A: Method and system for analysis of false positives produced by an automated scheme for the detection of lung nodules in digital chest radiographs. U.S. Pat. No. 5289374, February 1994.
33. Nishikawa R M, Giger M L, Doi K: Method for computer-aided detection of clustered microcalcifications from digital mammograms. U.S. Pat. No. 5,537,485, July 1996.
34. Giger M L, Doi K, Lu P, Huo Z: Automated method and system for improved computerized detection and classification of mass in mammograms. U.S. Pat. No. 5,832,103, November, 1998.
35. Giger M L, Bae K, Doi K: Automated method and system for the detection of lesions in medical computed tomographic scans. U.S. Pat. No. 5,881,124, March, 1999.
36. Bick U, Giger M L: Method and system for the detection of lesions in medical images. U.S. patent Allowed.
37. Giger M L, Zhang M, Lu P: Method and system for the detection of lesions and parenchymal distortions in mammograms. U.S. Pat. No. 5,657,362, August, 1997.
38. Giger M L, Kupinski M A: Automatic analysis of lesions in medical images. U.S. Pat. No. 6,138,045, Oct. 24, 2000.
39. Huo Z, Giger M L: Method and system for the computerized assessment of breast cancer risk. U.S. Pat. No. 6,282,305, Aug. 28, 2001.
40. Giger M L, Al-Hallaq H, Wolverton D E, Bick U: Method and system for the automated analysis of lesions in ultrasound images. U.S. Pat. No. 5,984,870, Nov. 16, 1999.
41. Gilhuijs K, Giger M L, Bick U: Method and system for the automated analysis of lesions in magnetic resonance images. U.S. patent Ser. No. 08/900,188 allowed.
42. Gilhuijs K, Giger M L, Bick U: Method and system for the assessment of tumor extent. U.S. patent Ser. No. 09/156,413, allowed;
43. Armato S G, Giger M L, MacMahon H: Method, system and computer readable medium for the two-dimensional and three-dimensional detection of lesions in computed tomography scans. U.S. patent Pending;
44. Giger M L, Vyborny C J, Huo Z, Lan L: Method, system and computer readable medium for an intelligent search workstation for computer assisted interpretation of medical images. U.S. patent pending, Ser. No. 09/773,636; and
45. Drukker K, Giger M L, Horsch K, Vyborny C J: Automated method and system for the detection of abnormalities in sonographic images. U.S. patent Pending Ser. No. 60/332,005.

The contents of each of these references, including patents and patent applications, are incorporated herein by reference. The techniques disclosed in the patents, patent applications and other references can be utilized as part of the present invention.

DISCUSSION OF THE BACKGROUND

The inventors' research, findings and analysis are discussed in this Background section along with that of others; accordingly, discussion in this section does not constitute an admission that the discussed material constitutes "prior art."

Breast cancer remains a disease without a cure unless it is found at a sufficiently early stage and subsequently surgically removed, irradiated, or eradicated with chemotherapy. Major research issues include those focused on genetic and molecular forms of detection and treatment, and those focused on anatomical levels of prevention, detection, and treatment. In these various areas, the role of the human interpreter (e.g., oncologist, radiologist, pathologist, surgeon, primary care physician) varies. However, the very presence of a human interpreter introduces subjective judgment into the decision-making process—whether it be in the initial detection (or miss) of a lesion on a mammogram or in the surgical decision regarding the type of incision. Thus, while ongoing research is needed in the biological aspects of cancer, in the physical aspects of instrumentation to better "see" the cancer, and in the biological/chemical/physical aspects of therapy, research is also needed for improving the role of the human in the overall management of the patient. Multi-modality and multi-disciplinary decision making on patient management, requiring inputs from oncologists, pathologists, radiologists, surgeons, and risk clinic physicians, can be quite subjective, as is often evident during case management conferences. Although "subjective" does not necessarily mean "poor judgement", it does permit suboptimal and inconsistent decision making.

Breast cancer is the leading cause of death for women in developed countries. Detection of breast cancer in an early stage increases success of treatment dramatically, and hence screening for breast cancer of women over 40 years of age is generally recommended. Current methods for detecting and diagnosing breast cancer include mammography, sonography (also referred to as ultrasound), and magnetic resonance imaging (MRI).

Mammography is the most effective method for the early detection of breast cancer, and it has been shown that periodic screening of asymptomatic women does reduce mortality (Refs. 1-6). Many breast cancers are detected and referred for surgical biopsy on the basis of a radiographically detected mass lesion or cluster of microcalcifications. Although general rules for the differentiation between benign and malignant mammographically identified breast lesions exist, considerable misclassification of lesions occurs with the current methods. On average, less than 30% of masses referred for surgical breast biopsy are actually malignant.

Computerized analysis schemes are being developed to aid in distinguishing between malignant and benign lesions in order to improve both sensitivity (true positive rate) and specificity (true negative rate). Comprehensive summaries of investigations in the field of mammography CAD (computer aided diagnosis) have been published by Giger and colleagues (Refs. 7-9). Investigators have used computers to aid in the decision-making process regarding likelihood of malignancy and patient management using human-extracted features and BI-RADS (Refs. 10-13). Such methods are dependent on the subjective identification and interpretation of the mammographic data by human observers. Gale et al. (Ref. 14) and Getty et al. (Ref. 15) both developed computer-based classifiers, which take as input diagnostically-relevant features obtained from radiologists' readings of breast images. Getty et al. found that with the aid of the classifier, community radiologists performed as well as unaided expert mammographers in making benign-malignant decisions. Swett et al. (Ref. 16) developed an expert system to provide visual and cognitive feedback to the radiologist using a critiquing approach combined with an expert system. Other investigators have been developing methods based on computer-extracted features (Refs. 17-24). The benefit of using computer-extracted features is the objectivity and reproducibility of the result. Radiologists employ many radiographic image features, which they seem to extract and interpret simultaneously and instantaneously. Thus, the development of methods using computer-extracted features requires, besides the determination of which individual features are clinically significant, the computerized means for the extraction of each such feature. Spatial features, which are characteristic of lesions, have been shown to be extractable by a computer analysis of the mammograms and to be useful in distinguishing between malignant and benign. Most methods are evaluated in terms of their ability to distinguish between malignant and benign lesions, however, a few have been evaluated in terms of patient management (i.e., return to screening vs. biopsy). It is important to state that while one of the aims of computerized classification is to increase sensitivity (true positive rate), another aim of computerized classification is to reduce the number of benign cases sent for biopsy. Such a reduction will be clinically acceptable only if it does not result in unbiopsied malignant cases, however, since the "cost" of a missed cancer is much greater than misclassification of a benign case. Thus, computer classification schemes should be developed to improve specificity (true negative rate) but not at the loss of sensitivity (true positive rate). We have shown that the computerized analysis of mass lesions (Refs. 17, 21) and clustered microcalcifications (Refs. 18, 22) on digitized mammograms yields performances similar to an expert mammographer and significantly better than average radiologists in the task of distinguishing between malignant and benign lesions.

We are investigating the potential usefulness of computer-aided diagnosis as an aid to radiologists in the characterization and classification of mass lesions in mammography. Observer studies have shown that such a system can aid in increasing the diagnostic accuracy of radiologists both in terms of sensitivity (true positive rate) and specificity (true negative rate). Our mass classification method includes three components: 1) automated segmentation of mass regions, 2) automated feature-extraction, and 3) automated classification. The method was initially trained with 95 mammograms containing masses from 65 patients. Features related to the margin, shape, and density of each mass are extracted automatically from the image data and merged into an estimate of the likelihood of malignancy (Refs. 17, 21, 23, 24). These features include a spiculation measure (FIG. 1), a margin definition feature (FIG. 2), and two density measures. The round-robin performance of the computer in distinguishing between benign and malignant masses was evaluated by receiver operating characteristic (ROC) analysis (Ref. 21). Our computer classification scheme yielded an Az value of 0.94, similar to that of an experienced mammographer (Az=0.91) and statistically significantly higher than the average performance of five radiologists with less mammographic experience (Az=0.81) (FIG. 3). With the database we used, the computer scheme achieved, at 100% sensitivity, a positive predictive value of 83%, which was 12% higher than that of the experienced mammographer and 21% higher than that of the average performance of the less experienced mammographers at a p-value of less than 0.001 (Ref. 21).

The computerized mass classification method was independently evaluated on a 110-case database consisting of 50 malignant and 60 benign cases (Ref. 24). The effects of variations in both case mix and in film digitization technique on the performance of the method were assessed. Categorization of lesions as malignant or benign using the computer achieved an Az value (area under the receiver operating characteristic (ROC) curve) of 0.90 on the prior training database (Fuji scanner digitization) in a round-robin evaluation, and Az values of 0.82 and 0.81 on the independent database for Konica and Lumisys digitization formats, respectively. However, in the statistical comparison of these performances, we failed to show a statistical significant difference between the performance on the training database and that on the independent validation database (p-values>0.10). Thus, our computer-based method for the classification of lesions on mammograms was shown to be robust to variations in case mix and film digitization technique (Ref. 24).

Subsequently we have developed advanced classifiers for the merging of features—characteristics of the lesion or image—into a probability or status of disease. These classifiers have potential to aid in the development of CAD methods in a limited database scenario.

SUMMARY OF THE INVENTION

Accordingly, an object of this invention is to provide a method and system that classifies images using non-parametric classification.

Accordingly, an object of this invention is to provide a method and system that classifies lesions using non-parametric classification.

Accordingly, an object of this invention is to provide a method and system that classifies disease status using non-parametric classification.

Another object of this invention to provide a method and system that perform computerized differential diagnosis of medical images using non-parametric classification.

These and other objects are achieved according to the invention by providing a new automated method and system that classifies lesions or medical images in which the analysis method involves non-parametric classification.

Preferred embodiments of the present invention provide a method and system that employ a lesion characterization module. A specific embodiment is a computerized method for the characterization of mammographic lesions combined with a computerized method for the classification of the lesions using non-parametric classification.

According to other aspects of the present invention, there are provided novel systems implementing the methods of this invention, and novel computer program products that upon execution cause the computer system to perform the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which:

FIG. 2(*a*) is an illustration defining the radial angle as the angle between the direction of the maximum gradient and its radial direction; FIG. 2(*b*) and 2(*c*) are illustrations showing normalized cumulated edge-gradient distributions for spiculated masses; and circular masses, respectively;

FIG. 3 shows the relationship between measures of spiculation and margin definition for malignant and benign mammographic masses;

FIG. 4 illustrates results of a test using an embodiment of the present invention;

FIG. 5 illustrates estimation results for various features;

DETAILED DESCRIPTION OF THE PREFERRED EMBODIMENTS

Figure 1:
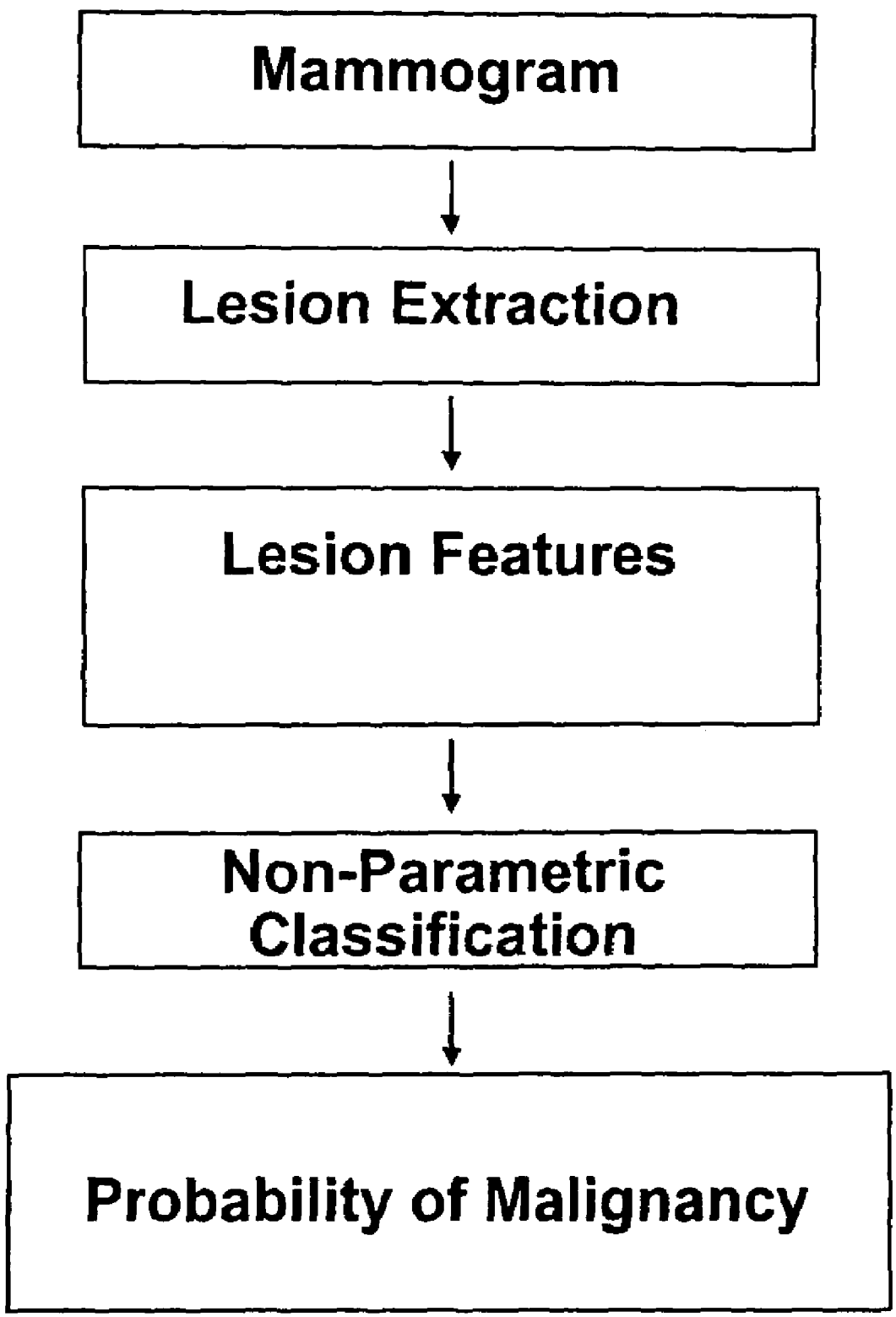
FIG. 1 is an illustration showing the overall methods for the computerized analysis of image data in CAD. These include detection, segmentation, characterization, and classification.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 schematically shows the overall method for computer-aided diagnosis indicating the role of non-parametric classification.

Classifiers such as linear discriminant analysis or artificial neural networks have limitations especially in a limited training database situation. Linear discriminant analysis may fail such as in the XOR problem. Artificial neural networks tend to be complex and difficult to model. Non-parametric classification can be applied to the various tasks in CAD to improve the use of computerized image analysis in medical imaging by optimizing the computer output.

While the inventors have investigated various computer-extracted features of lesions (and their relationship to likelihood of malignancy), it is novel to combine such features using non-parametric classifiers in order to improve characterization of the lesion, image, and/or disease status, especially when limited databases for training are available. A particular example is given here using non-parametric classification in the task of distinguishing between malignant and benign mammographic lesions.

Radiographically, mass lesions can be characterized (Refs. 7, 9) by, for example:

Lesion Feature 1: degree of spiculation (spiked versus rounded),
Lesion Feature 2: margin definition (margin sharpness),
Lesion Feature 3: shape,
Lesion Feature 4: density (determined using average gray level, contrast, texture),
Lesion Feature 5: homogeneity (texture),
Lesion Feature 6: asymmetry,
Lesion Feature 7: temporal stability,
and so forth.

Mass lesions from mammograms may be characterized using the inventors' earlier work (Refs. 17, 21, 23, 24) in which a characterization scheme based on the degree of spiculation is determined from a cumulative edge gradient histogram analysis in which the gradient is analyzed relative to the radial angle (FIG. 2). The mass is first extracted from the anatomic background of the mammogram using automatic region-growing techniques (Ref. 17). Features extracted are then obtained using cumulative edge gradient histogram analysis. In the cumulative edge-gradient analysis, the maximum gradient and angle of this gradient relative to the radial direction is calculated.

FIG. 2 illustrates the calculation of the FWHM (full width at half max) from the cumulative gradient orientation histogram for a spiculated mass and a smooth mass. Note that here the spiculation feature (based on the radial direction) is used in distinguishing between spiculated lesions and round lesions. Also, the average gradient along the margin of a mass will be calculated to describe the sharpness of the margin. Higher values indicate a sharper margin and thus a higher likelihood that the lesion is benign.

In addition, a radial gradient index (normalized radial gradient) (Refs. 21, 69) that describes the circularity and density characteristics of a lesion is used and is given by $$RGI = \frac{\sum_{P \in L} \cos\varphi \sqrt{D_x^2 + D_y^2}}{\sum_{P \in L} \sqrt{D_x^2 + D_y^2}}$$

where:
  RGI is a radial gradient index that is normalized to take on values between −1 and +1,
  P is an image point,
  L is the detected lesion excluding the center part,
  $D_x$ is the gradient in the x-direction,
  $D_y$ is the gradient in the y-direction, and
  $\phi$ is the angle between gradient vector and connection line from center point to neighbor point.

Although the radiographic density of a mass may not be by itself as powerful a predictor in distinguishing between benign and malignant masses as its margin features, taken with these features, density assessment can be extremely useful. The evaluation of the density of a mass is of particular importance in diagnosing circumscribed, lobulated, indistinct, or obscured masses that are not spiculated.

In order to assess the density of a mass radiographically, the present invention uses three density-related measures (average gray level, contrast, and texture measure) that characterize different aspects of the density of a mass. These measures are similar to those used intuitively by radiologists. Average gray level is obtained by averaging the gray level values of each point within the grown region of a mass. Contrast is the difference between the average gray level of the grown mass and the average gray level of the surrounding fatty areas (areas with gray-level values in the lower 20% of the histogram for the total surrounding area). Texture is defined here as the standard deviation of the average gradient within a mass and it is used to quantify patterns arising from veins, trabeculae, and other structures that may be visible through a low-density mass, but not through a high-density mass. A mass of low radiographic density should have low values of average gray level and contrast, and a high value of the texture measure, whereas a mass of high radiographic density should have high values of average gray level and contrast, and a low value of the texture measure.

FIG. 3 shows the relationship between measures of spiculation and margin definition for malignant and benign mammographic masses.

Non-parametric methods have been used for curve fitting in statistical analysis (Refs. 27-29). In the present invention however non-parametric classifiers are used to merge features (i.e., characteristics of the lesion or image) into a probability or status of disease. These classifiers are used to aid in the development of CAD methods in a limited database scenario.

A signal/noise classifier based on the ratio of density probabilities at the observed point produces the maximal area under the ROC curve, being in this sense the "best" classifier possible. Such a classifier is created by (1) constructing estimators of the signal and noise densities and (2) classifying observations based on the ratio of the estimated probability densities. Non-parametric density methods may also be used to estimate probability densities of unknown functional forms. Non-parametric estimates are unbiased in the large number limit. One embodiment of the invention is the application of the approach outlined above for the classification of breast lesions detected on mammography, using a database of breast lesions (malignant or benign) which already have been analyzed by a computer system yielding computer-extracted lesion features. The non-parametric density estimate is the product of 'blurring' the observations (treated as Dirac 'delta' functions) with a suitably chosen kernel. A number of blurring kernels are available to construct the probability density estimates. Parabolic kernels of fixed size ($1-x^2$ and $(1-x^2)^2$, for $|x|<1$) are optimal in some cases. Alternatively, the Gaussian kernel may be used as it produce smooth, unbounded, density estimates (closer to our perception of what the "true" probability density should be). The kernel may be of fixed size, or it can be adaptative (wider in regions where data are more sparse, narrower in regions where data are more dense). In some cases adaptative kernels offer faster convergence, but fixed-size kernels are preferable as they are more robust to implement. In addition, the size of a fixed kernel can be found based on theoretical criteria.

The probability densities in the feature space for benign and malignant lesions in a database can be estimated by summing up the blurring kernels centered in the observations, thus yielding the likelihood ratios. In the evaluation, lesions from an independent database can be classified based on the ratio of the estimated probability densities. The quality of fit will be estimated by the area beneath the corresponding ROC curve.

FIG. 4 shows an example for implementing non-parametric classification in CAD according to the present invention. The examples are given using a training database of 92 malignant (cancerous) lesion images and 110 benign lesion images and an independent testing database of 68 malignant lesion images and 38 benign lesion images.

The present invention uses a non-parametric method for classifying mammographic lesions in order to estimate the probability density function (PDF) of malignant and benign lesions in the feature space. The feature space can consist of various features including the limited list above that are extracted by the computer to characterize the lesions. The present invention uses non-parametric smoothing with a kernel, K, to estimate the PDFs. Finally, a ratio of probability densities (i.e., the likelihood ratio) is used to classify the lesions.

The PDF Estimator (i.e. the estimate of the PDF) is obtained by the following $$PDF(\vec{x}) = \sum_i K(\vec{x} - \vec{x}_i).$$

Where the kernel K may be paraboloid, Gaussian, Lorentzian or other forms.

FIG. 5 schematically shows the estimation of the probability density function of a given feature. The dot symbols indicate the feature values for seven potential malignant lesions. Each region is spread (blurred) using a specific kernel (size and shape) and then summed to yield the estimated PDF for that particular feature. Note that the kernel size and shape can be made adaptive to the denseness (or inversely to the sparcity) of the feature data points. This process is repeated for each feature type for the malignant lesions and for the benign lesions.

Ultimately one obtains the PDFs for the malignant lesions ($PDF_{malignant}$) and for the benign lesions ($PDF_{benign}$). The estimate of the likelihood ratio is calculated from the estimates of $PDF_{malignant}$ and $PDF_{benign}$ for all features values in the training database.

$$LR(x) = PDF_{malignant}(x)/PDF_{benign}(x)$$

The $LR(x_j)$ is then used to classify lesion j in the testing database, or any unknown lesion (or known lesion).

Figure 6:
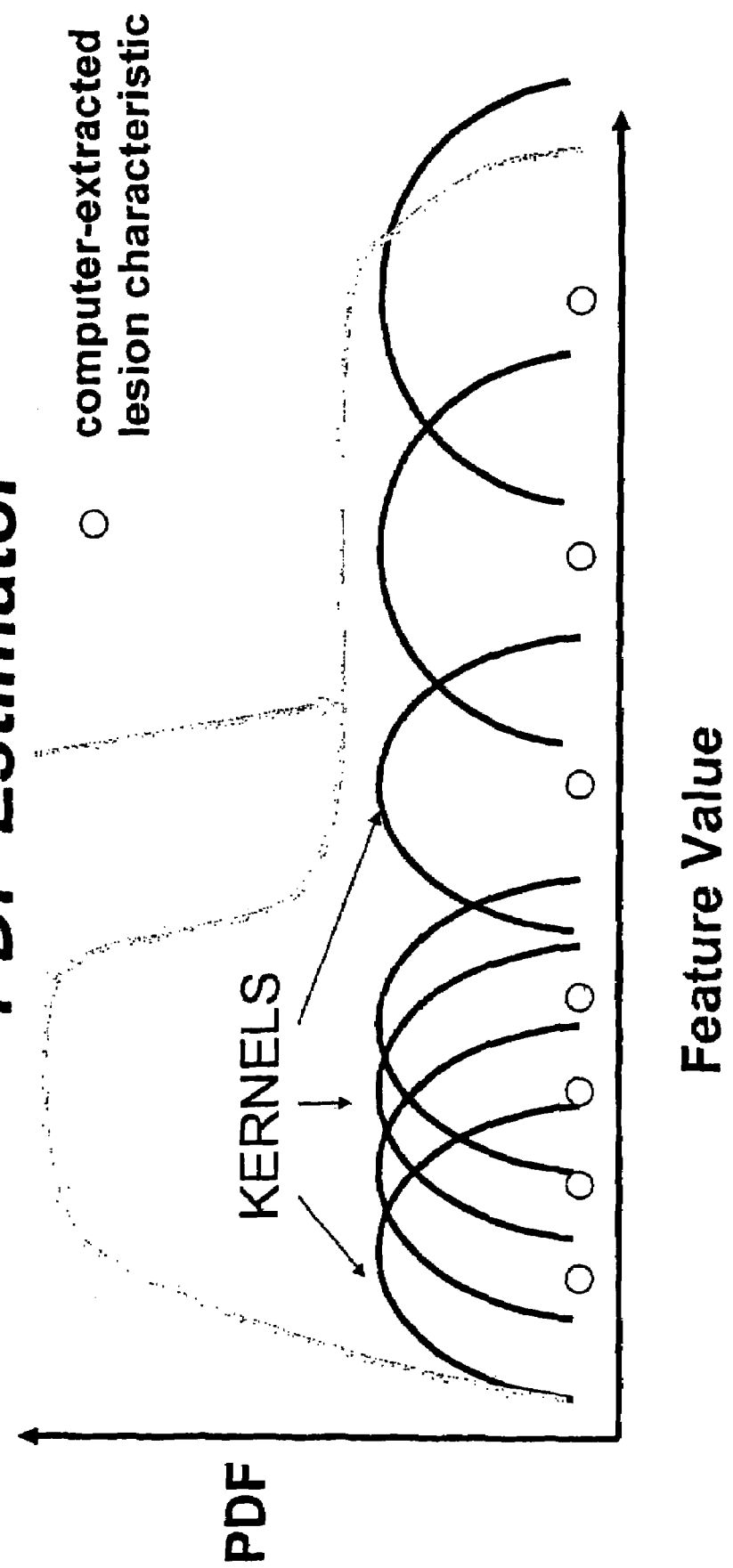
FIG. 6 illustrates the effect of varying kernel size in the present invention.

In a test of this invention, each lesion image was characterized by 5 computer-extracted features: radial gradient of margin, spiculation, margin sharpness, texture, and I average gray value. Then, the lesions were classified using combinations of features, two at a time using the non-parametric classification method. The kernel was a Gaussian kernel with the kernel width for a specific feature being a percentage of the range of the values for that feature over all the lesions. Note that for a given feature, the kernel width was kept fixed in determining the PDF. In an alternative embodiment the width could be varied to be, for example, larger when less data points are available. This is schematically illustrated in FIG. 6 in which the width of the kernel for the sparser-spaced data is larger.

Figure 7:
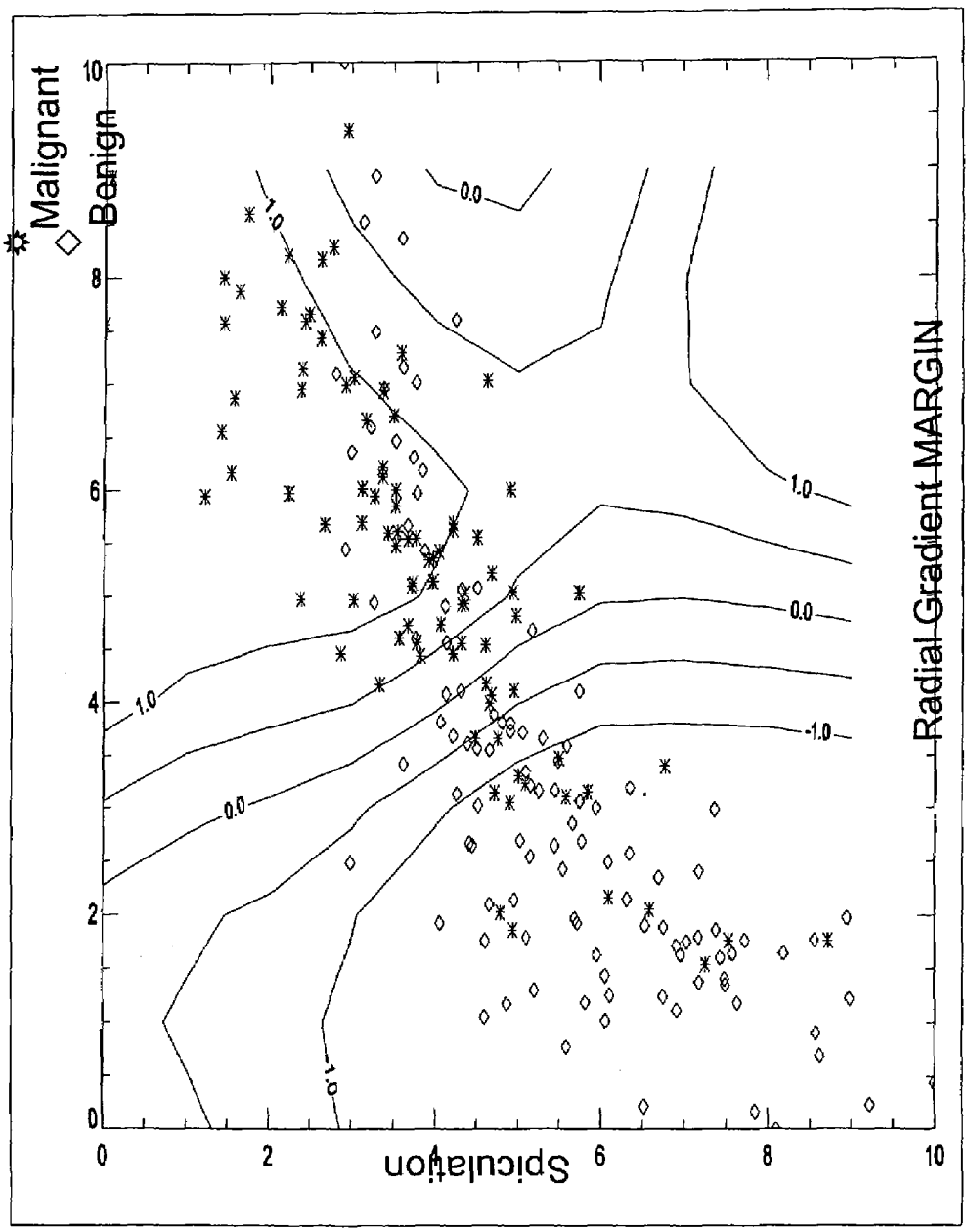
FIG. 7 illustrates results of a test of one embodiment of the present invention.

FIG. 7 demonstrates for the test performed the 2-dimensional distribution of the two features (spiculation and radial gradient along the margin) for malignant and benign lesions in the training database (i.e., a consistency result). In this test, a Gaussian kernel size of 10% of the feature range was employed. The separation line, indicated by the zero notation, yields an area under the ROC curve of 0.86 for the two-feature, non-parametric classifier in the task of distinguishing between malignant and benign lesions.

Figure 8:
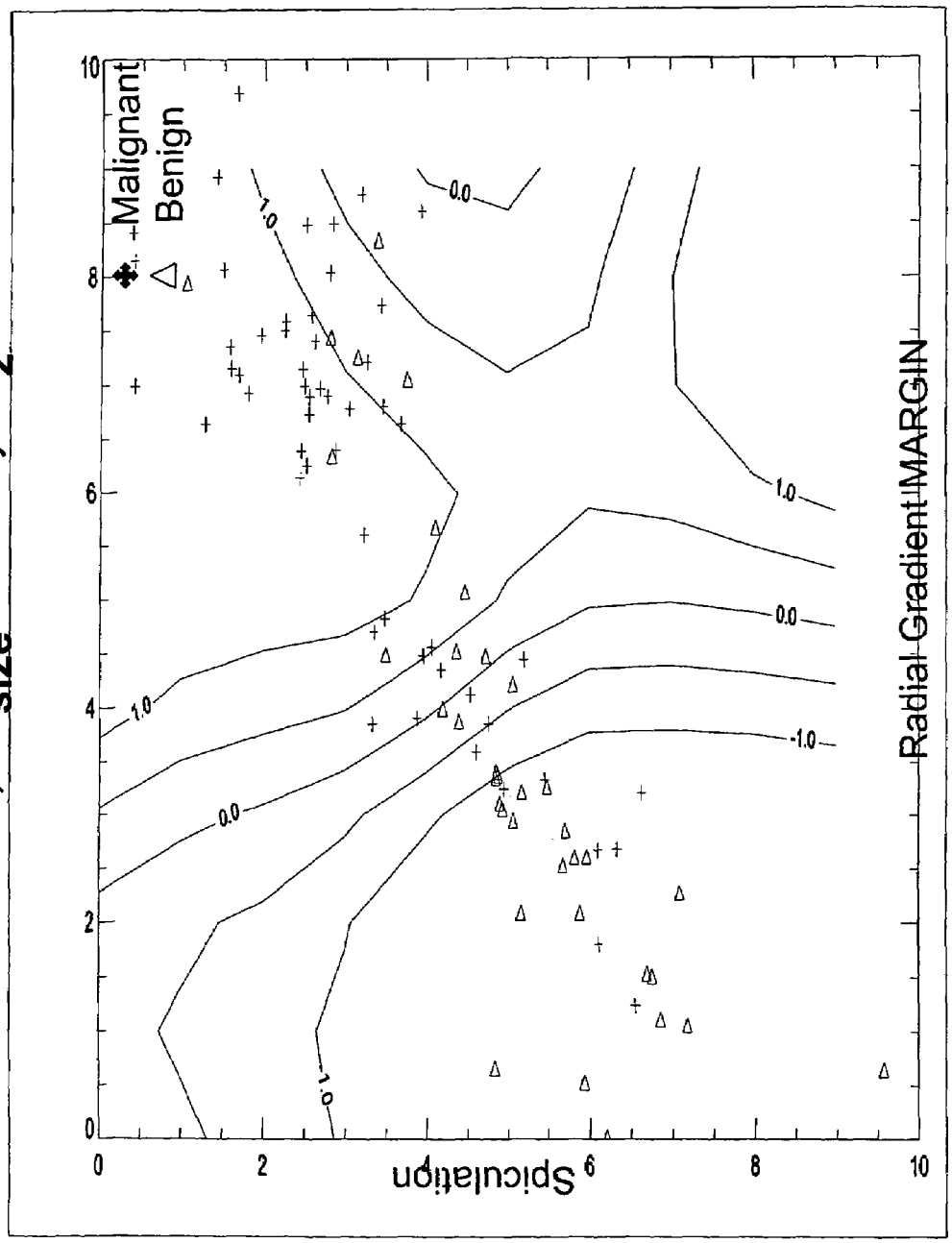
FIG. 8 illustrates corresponding test result distribution.

FIG. 8 demonstrates the corresponding 2-dimensional distribution for the independent testing database (i.e., a validation result). The separation line, indicated by the zero notation, yields an area under the ROC curve of 0.81 for the two-feature, non-parametric classifier in the task of distinguishing between malignant and benign lesions.

Figure 9:
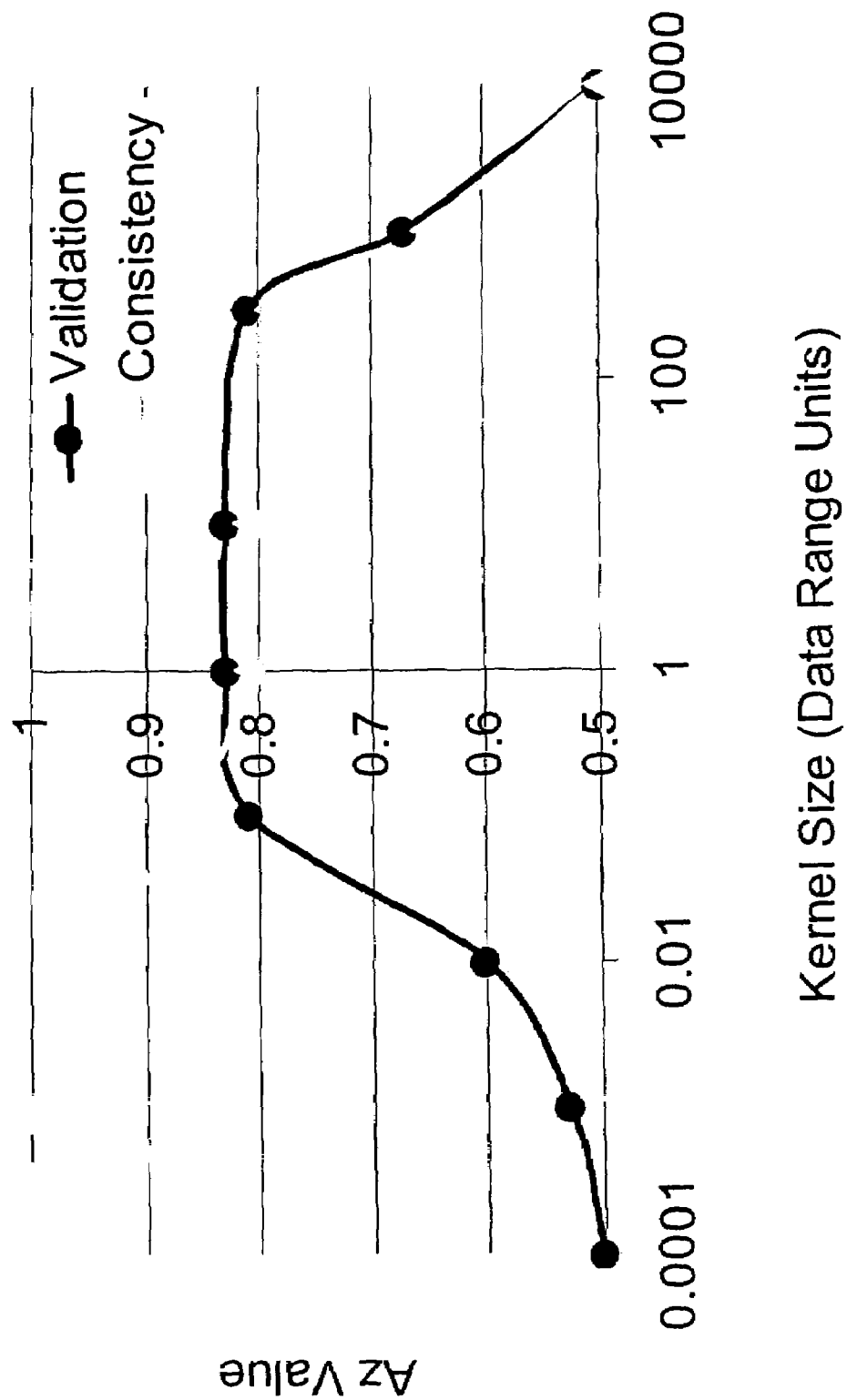
FIG. 9 illustrates the effect of kernel size or performance of various embodiments of the present invention.

FIG. 9 illustrates the effect of kernel size on the performance of the classifier in the task of distinguishing between malignant and benign lesion. Note that the classifier is quite robust over a range of kernel sizes.

The table below gives performance results for the non-parametric classifier in which features were merged two at a time. The method can be extended to merge more than two features, as the database increases. Here ROC analysis (Ref. 26) was used to determine the performance of the combined features sets in the task of classifying lesions as malignant or benign. The validation result is given.

TABLE 1

Area under Receiver Operating Characteristic (ROC) •curve

|  | Spiculation | Margin sharpness | Texture | Average gray level |
|---|---|---|---|---|
| RadGrad | 0.83 | 0.79 | 0.73 | 0.76 |
| Spiculation |  | 0/79 | 0.74 | 0.78 |
| Margin Sharpness |  |  | 0.51 | 0.54 |
| Texture |  |  |  | 0.53 |

It is evident from this testing that use of a non-parametric classifier can contribute to the classification of mass lesions by a computer, and likewise, can be expected to improve diagnoses. In addition, use of an adaptive kernel size dependent on the sparseness of feature data can be expected to improve the classification, especially when a limited database is used in training.

Although the method has been presented on mammographic breast image data sets, the inventive non-paramatric CAD analysis method can be implemented on other breast images (such as sonograms) in which a computerized image analysis is performed with respect to some disease state, or it can be implemented on other medical images (such chest radiographs or CT scans) with respect to some disease state or state of risk.

Numerous modifications and variations of the present invention are possible in light of the above teachings. It is therefore to be understood that within the scope of the appended claims and their equivalents, the invention may be practiced otherwise than as specifically described herein.

What is claimed as new and desired to be secured by Letters Patent of the United States is:

1. A method of analyzing a medical image to determine information concerning a disease that may be evidenced by a lesion in the medical image, the method comprising:
   extracting data corresponding to at least one feature of the lesion from the medical image; and
   determining the information concerning the disease, based on non-parametric smoothing of the extracted data over a database of previously stored feature data with one of a fixed or adaptive kernel, K, the adaptive kernel being wider in a region where the extracted data are more sparse, narrower in a region where the extracted data are more dense.

2. The method of claim 1, wherein the information comprises at least one from a group including:
   a decision on whether a lesion is present in the medical image;
   a characterization of a likelihood that the lesion is malignant;
   a characterization of a stage of cancer of the lesion;
   a characterization of the lesion as being malignant or benign; and
   a characterization of a likelihood that a malignancy will develop in the future.

3. The method of claim 1, wherein the extracting data step comprises:
   analyzing a surrounding environment of the lesion.

4. The method of claim 3, wherein the analyzing step comprises:
   assessing a parenchymal pattern surrounding the lesion in human breast tissue in a mammogram constituting the medical image.

5. The method of claim 1, wherein the extracting data step comprises:
   determining at least one feature from a group of features comprising:
   skewness of gray-values,
   spiculation,
   margin definition,
   shape,
   density,
   homogeneity,
   texture,
   asymmetry, and
   temporal stability.

6. The method of claim 1, where K is a paraboloid, Gaussian, or Lorentzian kernel.

7. The method of claim 1, wherein the information comprises an estimate of a probability density function (PDF) of a distribution of the at least one lesion feature over the database, and the PDF is calculated by the mathematical equation $$\text{PDF}(\vec{x}) = \Sigma_i K(\vec{x} - \vec{x}_i)$$

where $\vec{x}$ represents the extracted data, and $\vec{x}_i$ represents previously stored feature data.

8. A system, comprising:
   a data extraction device configured to extract data corresponding to at least one feature of the lesion from a medical image; and
   a processor configured to determine the information concerning the disease, based on non-parametric smoothing of the extracted data over a database of previously stored feature data with one of a fixed or adaptive kernel, K, the adaptive kernel being wider in a region where the extracted data are more sparse, narrower in a region where the extracted data are more dense.

9. A computer readable storage medium containing instructions configured to cause a computing device to execute a method comprising:
   extracting data corresponding to at least one feature of the lesion from the medical image; and
   determining the information concerning the disease, based on non-parametric smoothing of the extracted data over a database of previously stored feature data with one of a fixed or adaptive kernel, K, the adaptive kernel being wider in a region where the extracted data are more sparse, narrower in a region where the extracted data are more dense.

* * * * *